Figure 1:
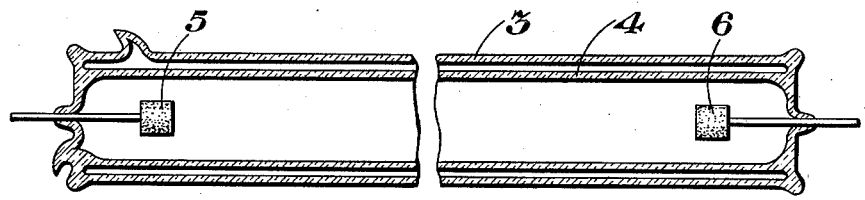

Aug. 7, 1934.    M. PIRANI ET AL    1,968,854

GASEOUS ELECTRIC DISCHARGE DEVICE

Original Filed Jan. 22, 1931

INVENTORS
Marcello Pirani
Martin Reger
Georg Gaidies
BY
ATTORNEY

Patented Aug. 7, 1934

1,968,854

UNITED STATES PATENT OFFICE 1,968,854

GASEOUS ELECTRIC DISCHARGE DEVICE

Marcello Pirani, Berlin - Wilmersdorf, Martin Reger, Berlin, and Georg Gaidies, Berlin-Pankow, Germany, assignors to General Electric Company, a corporation of New York Original application January 22, 1931, Serial No. 510,222. Divided and this application April 20, 1932, Serial No. 606,342. In Germany, February 8, 1930

3 Claims. (Cl. 176—122)

The present invention relates to gaseous electric discharge devices generally and more particularly the invention relates to such devices in which the gaseous content is a metal vapor, or in which a metal vapor is a component of the gaseous content.

It is well known in the art that a gaseous electric discharge device having a filling of cadmium metal vapor emits a pleasing greenish blue light; however, it is also well known in the art that such cadmium vapor filled electric discharge devices have hitherto been of slight practical use because the cadmium vapor condenses readily at temperatures above the melting temperatures of the usual glasses used in the containers of such devices, and further the glass container of such devices becomes coated with a brown or black coating after a short period of operation of the device to change the color of the cadmium vapor discharge.

It is the object of this invention to produce a glass suitable for use in the arts generally and particularly as the container for cadmium vapor filled electric discharge devices. We have discovered that such a glass having the desired characteristics of being easily workable, highly heat resisting, and chemically stable in the presence of an alkali metal vapor such as a cadmium vapor filling for example, may be produced if a boro-silicate glass containing besides the usual boric acid, alkalies, and alkali earths also contains at least 10% aluminum oxide ($Al_2O_3$) and less than 60% silicic acid ($SiC_2$), where the proportions are given in percentages by weight. A glass container made in accordance with the above formula does not become noticeably browned or blackened after 1,000 hours of operation as we have proven by experiment.

A suitable glass is produced if the constituents are mixed in percentages by weight according to the following formula:—

|  | Per cent |
|---|---|
| Boric oxide ($B_2O_3$) | 40 to 60 |
| Sodium oxide ($Na_2O$) | 4 to 5 |
| Calcium oxide (CaO) | 10 to 11 |
| Alumina $Al_2O_3$) | 11 to 13 |
| Silica ($SiO_2$) | 20 to 30 |

A particularly good glass of the above type for the containers of electric discharge devices having alkali metal vapor fillings is a glass having the following composition in percentages by weight:—

|  | Per cent |
|---|---|
| Boric oxide ($B_2O_3$) | 50 |
| Sodium oxide ($Na_2O$) | 4 |
| Calcium oxide (CaO) | 11 |
| Alumina ($Al_2O_3$) | 13 |
| Silica ($SiO_2$) | 22 |

It is possible to reduce the alkali and alkali earth content of the boric acid part of the glass slightly and to replace these by additional amounts of aluminum oxide and silicic acid in accordance with the following formula:—

|  | Per cent |
|---|---|
| Boric oxide ($B_2O_3$) | 8.5 to 15 |
| Sodium oxide and potassium oxide ($Na_2O+K_2O$) | 1.2 to 2 |
| Calcium oxide and magnesium oxide ($CaO+MgO$) | 13 to 15 |
| Alumina ($Al_2O_3$) | 19 to 25 |
| Silica ($SiO_2$) | 40 to 60 |

A particularly good glass of the above type for the containers of electric discharge devices having alkali metal vapor fillings is a glass having the following composition in percentages by weight:—

|  | Per cent |
|---|---|
| Boric oxide ($B_2O_3$) | 15 |
| Sodium oxide and potassium oxide ($Na_2O+K_2O$) | 2 |
| Calcium oxide and magnesium oxide ($CaO+MgO$) | 15 |
| Alumina ($Al_2O_3$) | 23 |
| Silica ($SiO_2$) | 45 |

The silicic acid of the boro-silicate glass in both cases may be replaced in part, for example, up to one half by the oxides of rare earths such as the oxides of lanthanum or didymium, or by a mixture of such oxides.

Figure 2:
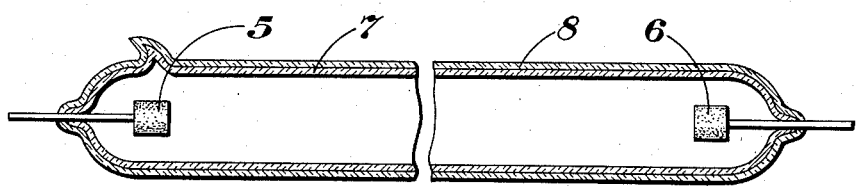

In the drawing accompanying and forming part of this specification two methods of adapting the new and novel boro-silicate glass for use in connection with cadmium vapor filled electric discharge devices are illustrated in which, Fig. 1 is a sectional side elevational view of one embodiment of a gaseous electric discharge device in which the new and novel boro-silicate glass is used, and Fig. 2 is a sectional side elevation view of another embodiment of an electric discharge device in which the new and novel boro-silicate glass is used.

Referring to Fig. 1 the device comprises a container having a double wall 3, 4 electrodes 5, 6 sealed therein and a filling of cadmium vapor, or a mixture of cadmium vapor and discharge conducting gas in said container 3, 4. The outer wall 3 of said container 3, 4 is made of the usual glass, such as Thüringer glass, made by the Jenaer Glasswerke Schott and Gen. located in Germany, which possesses a better acid lye and water stability than the boro-silicate glass of this invention, and is not affected by the outside atmosphere as is the boro-silicate glass of the present invention which is slightly hygroscopic. The inner wall 4 consists of the heat resisting, chemically inert with respect to cadmium vapor, boro-silicate glass heretofore disclosed. In this form of container the boro-silicate glass wall 4 is protected from the outside atmosphere and further, heat radiation from said wall 4 is reduced so that the possibility of harmful condensation of the cadmium vapor is lessened. The Thüringer glass and the boro-silicate glass of this invention have approximately the same coefficients of expansion so that they may be fused together as shown in the drawing.

Referring to Fig. 2 the device comprises a single walled container having electrodes 5, 6 sealed in at both ends thereof, a filling of cadmium vapor, or a mixture of cadmium vapor and a discharge conducting gas therein, said container being made of two layers 7, 8 inner layer 7 being of the boro-silicate glass of the present invention and outer layer 8 being of the usual weather resisting glass discussed in connection with Fig. 1. If desired, inner glass layer 7 may be very thin.

In both embodiments illustrated in Figs. 1 and 2 the outside walls may contain any desired color filter or they may be of heat absorbing glass as Schottshen glasses BG 9 and 10 which absorb the heat radiating from the electric discharge and are raised to a high temperature to prevent condensation of the cadmium vapor and a consequent loss of vapor pressure even with an extremely cold outside temperature. The BG 9 and BG 10 glasses above referred to are listed in Bulletin #4213 of the Jenaer Glasswerke Schott and Gen., the title of the bulletin being "Jenaer Color and Filter Glass for Scientific and Technical Uses", published in April, 1929. BG 10 glass has the following composition:

| | Percent |
|---|---|
| Silicic anhydride ($SiO_2$) | 66.12 |
| Boracic acid ($B_2O_3$) | 3.60 |
| Aluminum oxide ($Al_2O_3$) | 4.09 |
| Ferric oxide ($Fe_2O_3$) | 0.18 |
| Ferrous oxide (FeO) | 1.00 |
| Soda ($Na_2O$) | 9.95 } 10.24 |
| Potassium monoxide ($K_2O$) | 0.29 |
| Zinc oxide (ZnO) | 14.69 |
| | 99.92 |

The Thüringer glass above referred to is the usual soda-lime glass having a coefficient of thermal expansion permitting hermetic sealing to a platinum lead wire and well known to the glass trade and the electric lamp art.

While we have shown and described the container of Fig. 1 as a double wall container, and of Fig. 2 as a single wall container having two layers of glass having different compositions, it will be understood that we contemplate the use of our new and novel boro-silicate glass in electric discharge devices having containers of different structures. For example, the container may be in effect a double container with no point of fusion between the inner and outer container, in which case a glass having a greatly different coefficient of expansion than that of the boro-silicate glass of this invention may be used as the outer container and the current leads may have different coefficients of expansion over their length to correspond approximately to that of the glass containers at the sealing-in points of said wires in said containers in a manner well known in the art.

This application is a division of our co-pending application, Serial Number 510,222, filed January 22, 1931.

What we claim as new and desire to secure by Letters Patent of the United States, is:—

1. An electric discharge device comprising a container, electrodes sealed therein, a gaseous atmosphere therein comprising alkali metal vapor, said container comprising a glass containing alkalies, alkali earths, boric acid, at least 10% aluminum oxide ($Al_2O_3$) and not less than about 20% nor more than 60% silicic acid ($SiO_2$).

2. An electric discharge device comprising a container, electrodes sealed therein, a gaseous atmosphere therein comprising cadmium vapor, said container comprising a glass containing between

| | Percent |
|---|---|
| Boric oxide ($B_2O_3$) | 40 to 60 |
| Sodium oxide ($Na_2O$) | 4 to 5 |
| Calcium oxide (CaO) | 10 to 11 |
| Alumina ($Al_2O_3$) | 11 to 13 |
| Silica ($SiO_2$) | 20 to 30 |

3. An electric discharge device comprising a container, electrodes sealed therein, a gaseous atmosphere therein comprising cadmium vapor, said container comprising a glass containing between

| | Percent |
|---|---|
| Boric oxide ($B_2O_3$) | 8.5 to 15 |
| Sodium oxide and potassium oxide ($Na_2O+K_2O$) | 1.2 to 2 |
| Calcium oxide and magnesium oxide (CaO+MgO) | 13 to 15 |
| Alumina ($Al_2O_3$) | 19 to 23 |
| Silica ($SiO_2$) | 40 to 60 |

MARCELLO PIRANI.
MARTIN REGER.
GEORG GAIDIES.